(12) United States Patent
Lindoff et al.

(10) Patent No.: US 8,520,777 B2
(45) Date of Patent: Aug. 27, 2013

(54) OPERATION OF USER EQUIPMENT WHEN CONTROL AND DATA INFORMATION ARE SUPPLIED BY DIFFERENT RADIO UNITS

(75) Inventors: Bengt Lindoff, Bjärred (SE); Fredrik Nordström, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 373 days.

(21) Appl. No.: 13/033,722

(22) Filed: Feb. 24, 2011

(65) Prior Publication Data

US 2012/0219094 A1 Aug. 30, 2012

(51) Int. Cl.
*H04L 27/00* (2006.01)

(52) U.S. Cl.
USPC .......................................................... 375/316

(58) Field of Classification Search
USPC ................. 375/285, 316, 340, 355; 370/343, 370/348, 350
See application file for complete search history.

(56) References Cited

U.S. PATENT DOCUMENTS

| 2004/0160936 | A1* | 8/2004 | Liu et al. ...................... | 370/348 |
| 2007/0064666 | A1* | 3/2007 | Kwun et al. ................... | 370/343 |
| 2010/0323684 | A1  | 12/2010 | Cai et al. | |
| 2012/0113843 | A1* | 5/2012 | Watfa et al. ................... | 370/252 |

OTHER PUBLICATIONS

PCT International Search Report, mailed Jul. 3, 2012, in connection with International Application No. PCT/EP2012/052006.
PCT Written Opinion, mailed Jul. 3, 3012, in connection with International Application No. PCT/EP2012/052006.
Institute for Information Industry (III) et al. "Frequency Synchronization in Type 2 Relay", 3GPP Draft; R1-102287, 3rd Generation Partnership Project (3GPP), Mobile Competence Centre; 650, Route Des Lucioles, F-06921 Sophia-Antipolis Cedex, France, vol. RAN WG1, No. Beijing, China; 20100412, Apr. 6, 2010, XP050419532.
Research in Motion et al: "Type-II Relay Reference Signal Transmission and UE Association" 3GPP Draft; R1-092419 (RIM-Type 2 Relay RS), 3rd Generation Partnership Project (3GPP), Mobile Competence Centre; 650, Route Des Lucioles, F-06921 Sophia-Antipolis Cedex, France, No. Los Angeles, USA; 20090624, Jun. 24, 2009, XP050350933.

(Continued)

*Primary Examiner* — Khanh C Tran
(74) *Attorney, Agent, or Firm* — Potomac Patent Group PLLC (57) ABSTRACT

A receiver operates in a mobile communication system that comprises first node and second nodes, the first and second nodes transmitting common control signals and dedicated data signals, respectively. The receiver determines a first timing rotation and/or a first frequency rotation of the common control signals and a second timing rotation and/or a second frequency rotation of the dedicated data signals. The receiver determines a first and/or second difference, wherein the first difference is a difference between the first timing rotation of the common control signals and the second timing rotation of the dedicated data signals and the second difference is a difference between the first frequency rotation of the common control signals and the second frequency rotation of the dedicated data signals. An adapted timing of dedicated data signals is produced based on the first and/or second differences, and the adapted timing is used to receive dedicated data signals.

38 Claims, 8 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical layer for relaying operation (Release 10)", 3GPP Standard; 3GPP TS 36.216, 3rd Generation Partnership Project, Mobile Competence Centre, 650, Route Des Lucioles, F-06921 Sophia-Antipolis Cedex, France, No. V10.1.0, Dec. 21, 2010, pp. 1-15, XP050462351.

Catt et al. "Design of Relay Frame Timing in LTE-A", 3GPP Draft, R1-101774, 3rd Generation Partnership Project (3GPP), Mobile Competence Centre, 650, Route Des Lucioles, F-06921 Sophia-Antipolis Cedex, France, vol. RAN WG1, No. Beijing, China; Apr. 12, 2010, Apr. 6, 2010, XP050419183.

* cited by examiner

OPERATION OF USER EQUIPMENT WHEN CONTROL AND DATA INFORMATION ARE SUPPLIED BY DIFFERENT RADIO UNITS

BACKGROUND

The present invention relates to cellular communication systems, and more particularly to the operation of user equipment when control and data information are supplied by different radio units in a cellular communication system.

Figure 1:
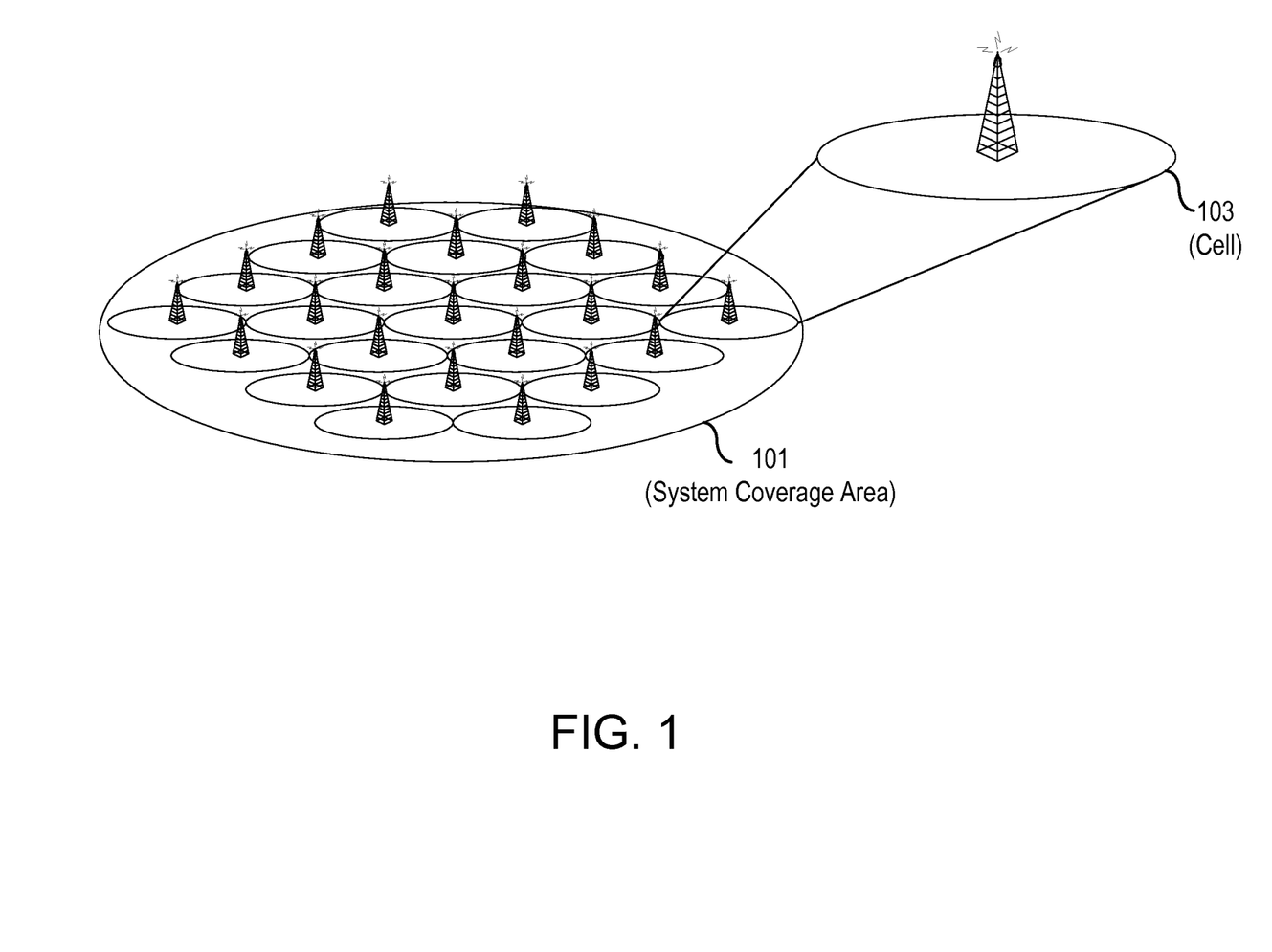
FIG. 1 illustrates a cellular communication system providing a system coverage area by means of a plurality of cells.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. As the mobile terminal moves from one cell to another, the network hands over responsibility for serving the mobile terminal from the presently-serving cell to the "new" cell. In this way, the user of the mobile terminal experiences continuity of service without having to reestablish a connection to the network. FIG. 1 illustrates a cellular communication system providing a system coverage area 101 by means of a plurality of cells 103.

Present-day cellular communication systems are typically based on a homogenous network, mainly consisting of large macro cells, each cell having one transmitter/radio unit that serves the entire cell. In future cellular systems, heterogeneous network architectures can be expected comprising a mix of large macro and small pico/femto cells. Furthermore, there will also be situations where a specific cell has several radio units. Such solutions make it possible to utilize advanced multiple-input-multiple-output (MIMO) technology and beam forming schemes and thereby improve the entire system spectral efficiency.

Figure 2:
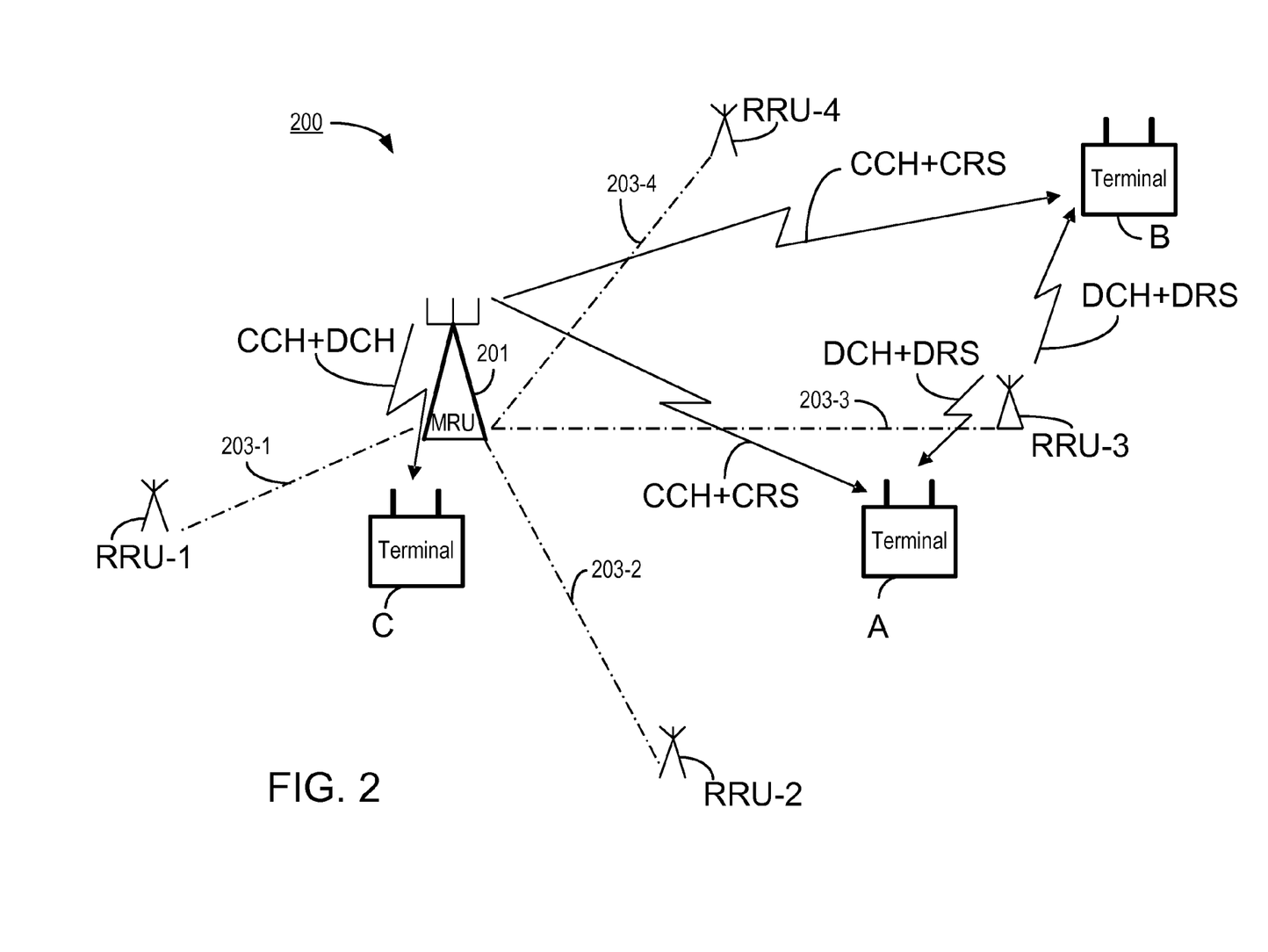
FIG. 2 illustrates a serving cell having a main radio unit connected to each of four remote radio units, and having three terminals operating in the cell.

FIG. 2 shows one such example involving a serving cell 200 with a main radio unit (MRU) 201, four remote radio units (RRU-1, RRU-2, RRU-3, and RRU-4), and three terminals denoted A, B, and C, respectively. Each of the remote radio units RRU-1 . . . RRU-4 is connected to the MRU 201 by means of a respective link 203-1 . . . 203-4 (collectively referenced as "203"). In this case, the main radio unit 201 is transmitting control channels (CCH) and common reference symbols (CRS) that are used by all terminals (A-C) connected to the cell 200. The CRS:s are used for demodulation of the CCH as well as for mobility measurements. The CRS:s are also used by each terminal for fine tuning in time and frequency synchronization operations. However, dedicated reference symbols (DRS) are used for data reception on data channels (DCH). The DCH and DRS could furthermore be transmitted from different remote radio units (RRU-1 . . . RRU-4) that might be closer to the terminal. In FIG. 2, terminal C gets both the DCH and the CCH from the main radio unit 201. By contrast, terminals A and B each receive the CCH from the MRU 201 while data originates from one of the remote radio units (i.e., in this example RRU-3). The RRU:s could be distributed over the entire cell 200, thereby creating a network architecture that supports the use of advanced MIMO and beam forming schemes. Such a solution as in FIG. 2 with DRS is allowed and already introduced in the Long Term Evolution (LTE) standard denoted LTE Release 8/9.

The inventors of the subject matter described herein have recognized one or more problems presented by arrangements such as that which is depicted in FIG. 2. For example, if data and control signals originate from different radio units (e.g., CCH originating from the MRU 201 and DCH originating from one of the RRU:s), these signals can arrive with different timing at the terminal. Typically, in such an arrangement as is shown in FIG. 2, the data from any given one of the RRU:s is time compensated by a network controlling node (in LTE, denoted the eNode B) in order to compensate for the delay in the cable/link 203 between the MRU 201 and the given RRU. However the terminals are likely to move around, and depending on a given terminal's exact location (see, e.g., the different locations of terminals A and B), this strategy may not achieve exact time compensation; in fact, it is expected that a time difference of, approximately 0.5-1 microsecond between the CCH and DCH is likely. In LTE systems, which use Orthogonal Frequency Division Multiplexing (OFDM), as long as the time difference between radio paths of a given signal is smaller than the cyclic prefix (CP) (4.7 micro sec in LTE) the CP itself can mitigate the effects of time dispersion. However, in situation described above, the classical time dispersion case is not presented because it does not involve different paths of the same signal, but rather different data (CCH+CRS vs. DCH+DRS) being transmitted from the two different radio units.

As mentioned above, each terminal relies on the CRS to synchronize its own timing and frequency, and there will be approximately up to 1 microsec difference between each terminal's expected timing (i.e., based on the CRS) and the actual DCH timing. Hence, once a terminal performs a Fast Fourier Transform (FFT) on the received signal based on CRS information, a significant frequency rotation over the resource elements (i.e., a group of sub-carriers over a predefined period of time) in the frequency-domain is introduced in the data channel (relative to the control channel). The same holds for frequency error, but the rotation will be over a resource element in the time domain. The accuracy in transmission frequency between the main and remote nodes should be within ±100-200 Hz, but assuming different sign on the frequency error between main node (MRU 201) and a remote node (RRU-x) there will be a significant frequency rotation in time between the CCH (which the terminal uses as frequency reference) and the DCH. The above mentioned problem will introduce noise and modeling errors in the channel estimation process and thereby result in degraded receiver performance.

Therefore, there is a need for methods and apparatuses that are able to detect and compensate for timing and/or frequency errors that result when a terminal receives information from two different radio units and derives its own timing/frequency synchronization from only one of them.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for operating a mobile receiver in a mobile communication system, wherein the mobile communication system comprises first and second nodes, wherein the first node transmits common control signals and the second node transmits dedicated data signals. Such operation comprises determining at least one of a first timing rotation of the common control signals and a first frequency rotation of the common control signals; and determining at least one of a second timing rotation of the dedicated data signals and a second frequency rotation of the dedicated data signals. The receiver then determines at least one of a first difference and a second difference, wherein the first difference is a difference between the first timing rotation of the common control signals and the second timing rotation of the dedicated data signals and the second difference is a difference between the first frequency rotation of the common control signals and the second frequency rotation of the dedicated data signals. An adapted timing of dedicated data signals is produced based on at least one of the first and second differences. The adapted timing is used to receive dedicated data signals.

In some embodiments, a first relationship result is determined by ascertaining whether the first difference satisfies a predetermined relationship with respect to a first threshold and determining a second relationship result by ascertaining whether the second difference satisfies a predetermined relationship with respect to a second threshold. In such embodiments, producing the adapted timing of dedicated data signals is performed only in response to at least one of the first and second relationship results indicating satisfaction of a predetermined relationship.

In some embodiments, determining at least one of the second timing rotation of the dedicated data signals and the second frequency rotation of the dedicated data signals is based on dedicated reference signals received by the receiver.

Determining the first frequency rotation of the common control signals can be achieved in any of a number of different ways. For example, determining the first frequency rotation of the common control signals can, in some embodiments, comprise producing a plurality of Instant Channel Estimate (ICH) pairs by, for a plurality of pairs of first and second sub-carriers occurring at a first Orthogonal Frequency Division Multiplexing (OFDM) symbol time, wherein each of the first and second sub-carriers communicates a common reference symbol and for each pair of first and second sub-carriers, the first and second sub-carriers are adjacent pilot positions in the frequency domain:
    producing a first ICH for the first sub-carrier;
    producing a second ICH for the second sub-carrier; and
    producing an ICH pair by multiplying the first ICH by the complex conjugate of the second ICH.
A rotation in frequency is then determined by summing the plurality of ICH pairs.

In some alternative embodiments, determining the first frequency rotation of the common control signals comprises producing a plurality of Instant Channel Estimate (ICH) pairs by, for each of a plurality of Orthogonal Frequency Division Multiplexing (OFDM) symbols containing common reference symbols:
    identifying pairs of first and second sub-carriers that are a component of said each OFDM symbol, wherein each of the first and second sub-carriers communicates a common reference symbol and for each pair of first and second sub-carriers, the first and second sub-carriers are adjacent pilot positions in the frequency domain; and
    for each of the pairs of first and second sub-carriers:
        producing a first ICH for the first sub-carrier;
        producing a second ICH for the second sub-carrier; and
        producing an ICH pair by multiplying the first ICH by the complex conjugate of the second ICH.
A rotation in frequency is then determined as the arctangent of the imaginary part of the sum of the plurality of ICH pairs divided by the real part of the sum of the plurality of ICH pairs.

Determining the second frequency rotation of the dedicated data signals can be accomplished in any of a number of ways.

For example, in some embodiments, determining the second frequency rotation of the dedicated data signals comprises producing a plurality of Instant Channel Estimate (ICH) pairs by, for a plurality of pairs of first and second sub-carriers located within a same contiguous block of sub-carriers allocated to the mobile receiver and occurring at a first Orthogonal Frequency Division Multiplexing (OFDM) symbol time, wherein each of the first and second sub-carriers communicates a dedicated reference symbol and for each pair of first and second sub-carriers, the first and second sub-carriers are adjacent pilot positions in the frequency domain:
    producing a first ICH for the first sub-carrier;
    producing a second ICH for the second sub-carrier; and
    producing an ICH pair by multiplying the first ICH by the complex conjugate of the second ICH.
A rotation in frequency is then determined by summing the plurality of ICH pairs.

In some alternative embodiments, determining the second frequency rotation of the dedicated data signals comprises producing a plurality of Instant Channel Estimate (ICH) pairs by, for each of a plurality of Orthogonal Frequency Division Multiplexing (OFDM) symbols containing dedicated reference symbols:
    identifying pairs of first and second sub-carriers located within a same contiguous block of sub-carriers allocated to the mobile receiver and that are a component of said each OFDM symbol, wherein each of the first and second sub-carriers communicates a dedicated reference symbol and for each pair of first and second sub-carriers, the first and second sub-carriers are adjacent pilot positions in the frequency domain; and
    for each of the pairs of first and second sub-carriers:
        producing a first ICH for the first sub-carrier;
        producing a second ICH for the second sub-carrier; and
        producing an ICH pair by multiplying the first ICH by the complex conjugate of the second ICH.
In such embodiments, a rotation in frequency is determined as the arctangent of the sum of the plurality of ICH pairs divided by the real part of the sum of the plurality of ICH pairs.

In another aspect of some embodiments, determining the first timing rotation of the common control signals comprises producing a plurality of Instant Channel Estimate (ICH) pairs by, for a plurality of pairs of adjacent Orthogonal Frequency Division Multiplexing (OFDM) symbol times, performing, for each of one or more given sub-carriers that communicate a common reference symbol:
    producing a first ICH for a first one of the OFDM symbol times;
    producing a second ICH for a second one of the OFDM symbol times; and
    producing an ICH pair by multiplying the first ICH by the complex conjugate of the second ICH.
A rotation in timing is then determined by summing the plurality of ICH pairs.

In another aspect of some embodiments, determining the second timing rotation of the dedicated data signals comprises producing a plurality of Instant Channel Estimate (ICH) pairs by, for a plurality of pairs of adjacent Orthogonal Frequency Division Multiplexing (OFDM) symbol times of time-wise adjacent dedicated reference symbols, performing, for each of one or more given sub-carriers that communicate a dedicated reference symbol:
    producing a first ICH for a first one of the OFDM symbol times;
    producing a second ICH for a second one of the OFDM symbol times; and producing an ICH pair by multiplying the first ICH by the complex conjugate of the second ICH.

A rotation in timing is then determined as the arctangent of the imaginary part of the sum of the plurality of ICH pairs divided by the real part of the sum of the plurality of ICH pairs.

In another aspect of some embodiments, scaling of the determined frequency is performed for sub-carriers located between the first and second sub-carriers, wherein the amount of scaling is based on the frequency distance between the first and second sub-carriers.

In another aspect of some embodiments, scaling of the determined timing is performed for OFDM symbol times located between the first and second OFDM symbol times, wherein the amount of scaling is based on the timing distance between the first and second OFDM symbol times.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a control unit of a terminal operating in a cell uses received common reference symbols to determine the timing and frequency error of the cell's control channel and uses received dedicated reference symbols to determine the timing and frequency error of its data channel. If the timing/frequency error for the data channel is different from that of the control channel, the terminal adapts its timing for the control channel and adapts its timing for the data channel, and these adaptations are made independent of one another. Such adaptation could be made by, for example, changing the timing of an FFT window used in reception, the particular change being dependent on whether it is a control channel or a data channel OFDM symbol being received.

In some cases in which an OFDM symbol contains both control channel and data channel information, two FFTs with different timing can be applied to the received symbol could be taken. In some alternative embodiments, the control channel timing is utilized to determine placement of the FFT window and thereby receive the control channel information, and post-FFT compensation is applied to the data channel resource elements by the amount of frequency shift introduced by the time/frequency difference between the control and data channels.

These and other aspects are now described in further detail below. To facilitate the discussion, terminology and elements applicable to LTE systems are used. However, the invention is not limited to such embodiments, but is instead applicable in other communication systems as well.

In accordance with the LTE standard, the air interface is divided up, timewise, into sequentially occurring frames. Each frame consists of ten sub-frames. In the downlink, each sub-frame has two slots, which can each have either six or seven consecutively occurring OFDM symbols. (The ability to configure the downlink to have only six OFDM symbols allows for each symbol to have a longer cyclic prefix, which can be useful for very large cells or when multicast communications are being performed.)

Figure 3:
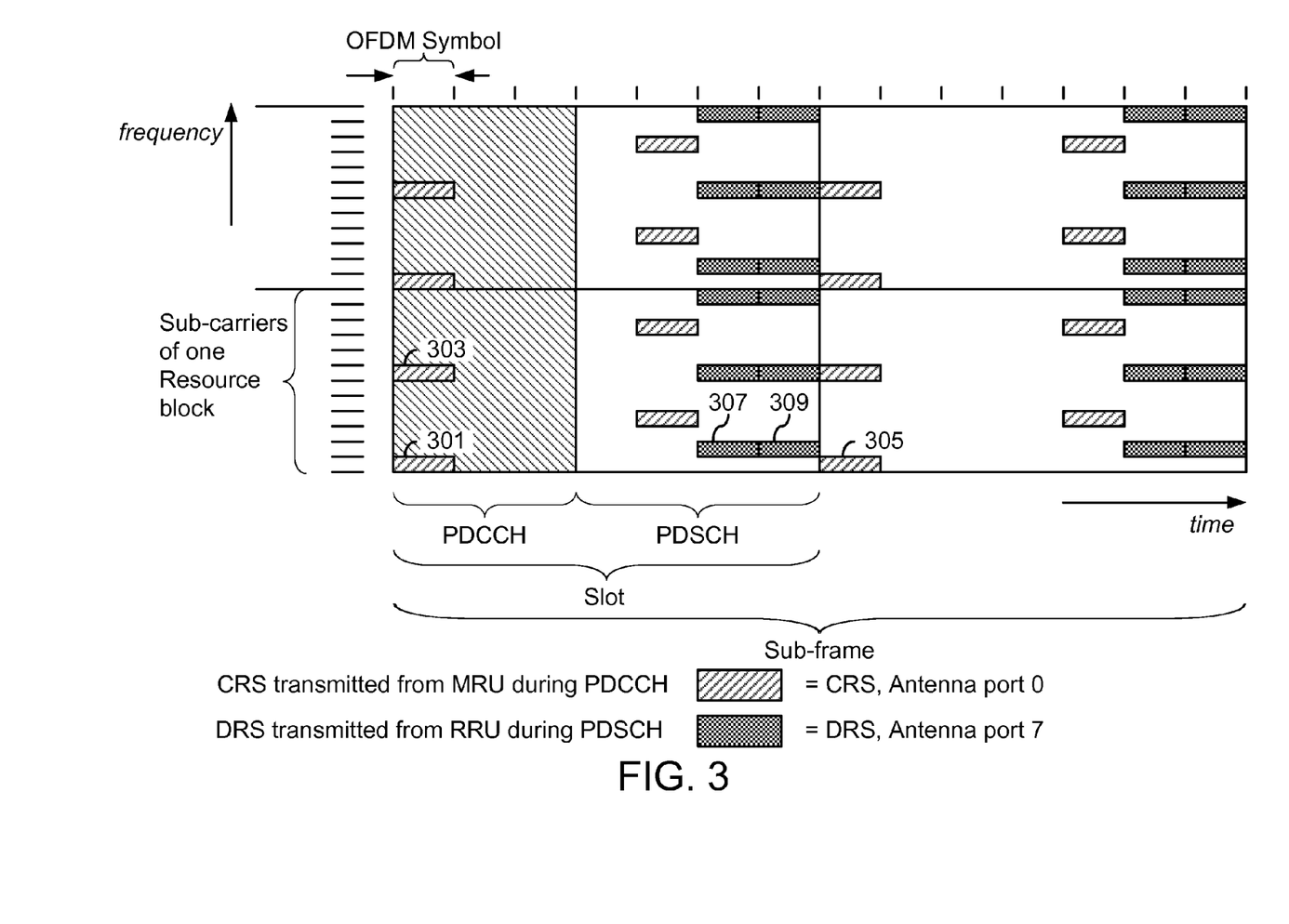
FIG. 3 illustrates an LTE slot and sub-frame structure, including common reference symbols and dedicated reference symbols transmitted from one antenna port.

FIG. 3 illustrates an LTE slot and sub-frame structure, including common reference symbols (CRS:s) and dedicated reference symbols (DRS:s) transmitted from one antenna port. Each sub-frame, lasting 1 ms, consists of two slots and a variable number of resource blocks. A resource block is defined as 12 sub-carriers taking place during one slot time. Two resource blocks are depicted in each of the two slots depicted in FIG. 3. The actual number of resource blocks allocated to a terminal will depend on the system bandwidth, which is configurable between 1.4-20 MHz. In this example, the CCH, called the Physical Dedicated Control CHannel ("PDCCH") in LTE systems, is transmitted in the first 1-3 (4 in 1.4 MHz—not shown) OFDM symbols in a subframe. More generally, the PDCCH can occupy 1, 2, or 3 symbols, with the particular number being signaled in the first OFDM symbol in a sub-frame. The PDCCH conveys information informing about where different terminals can find their data (i.e., which resource blocks) as well as which modulation and coding schemes are being used. Furthermore, to demodulate the PDCCH as well as to perform mobility measurements, common reference symbols are transmitted in OFDM symbols 0, 4, 7 and 11 on every sixth sub-carrier in each sub-frame. It is noted that only the common reference symbols from one eNode B antenna port are shown. ("Antenna port" is the term used in 3rd Generation Partnership Project—"3GPP"—systems. Usually, one (common reference) antenna port is mapped to one physical antenna.) In some instances, there could be up to 4 common reference ports (antennas). The PDCCH and common reference symbols are always transmitted from the master radio unit 201. The PDSCH as well as the dedicated reference symbols, however, could as mentioned above, be transmitted from master radio unit 203 or from a remote radio unit RRU-x. The dedicated reference symbols are transmitted on sub-carriers 1, 6, and 11 of each resource block during the last two OFDM symbols of each slot.

Figure 4A:
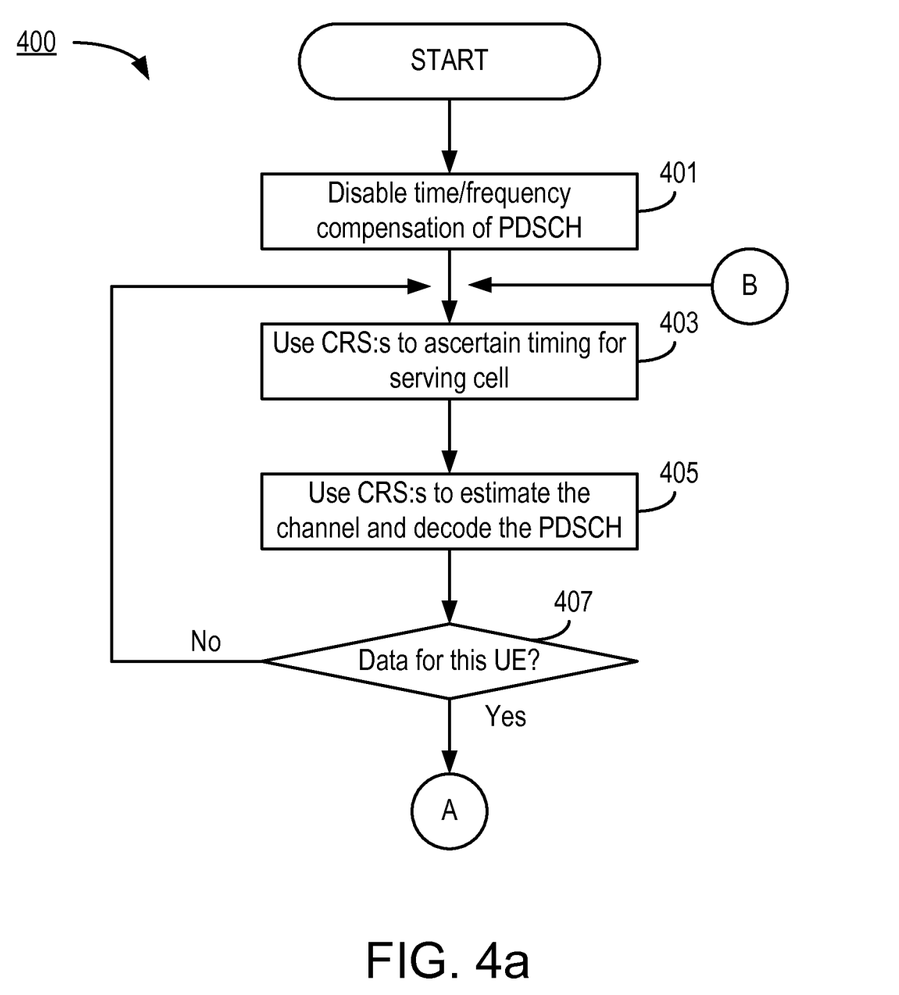
FIGS. 4a and 4b are, in one respect, a flow chart of steps/processes performed by a UE in accordance with exemplary embodiments of the invention.
Figure 4B:
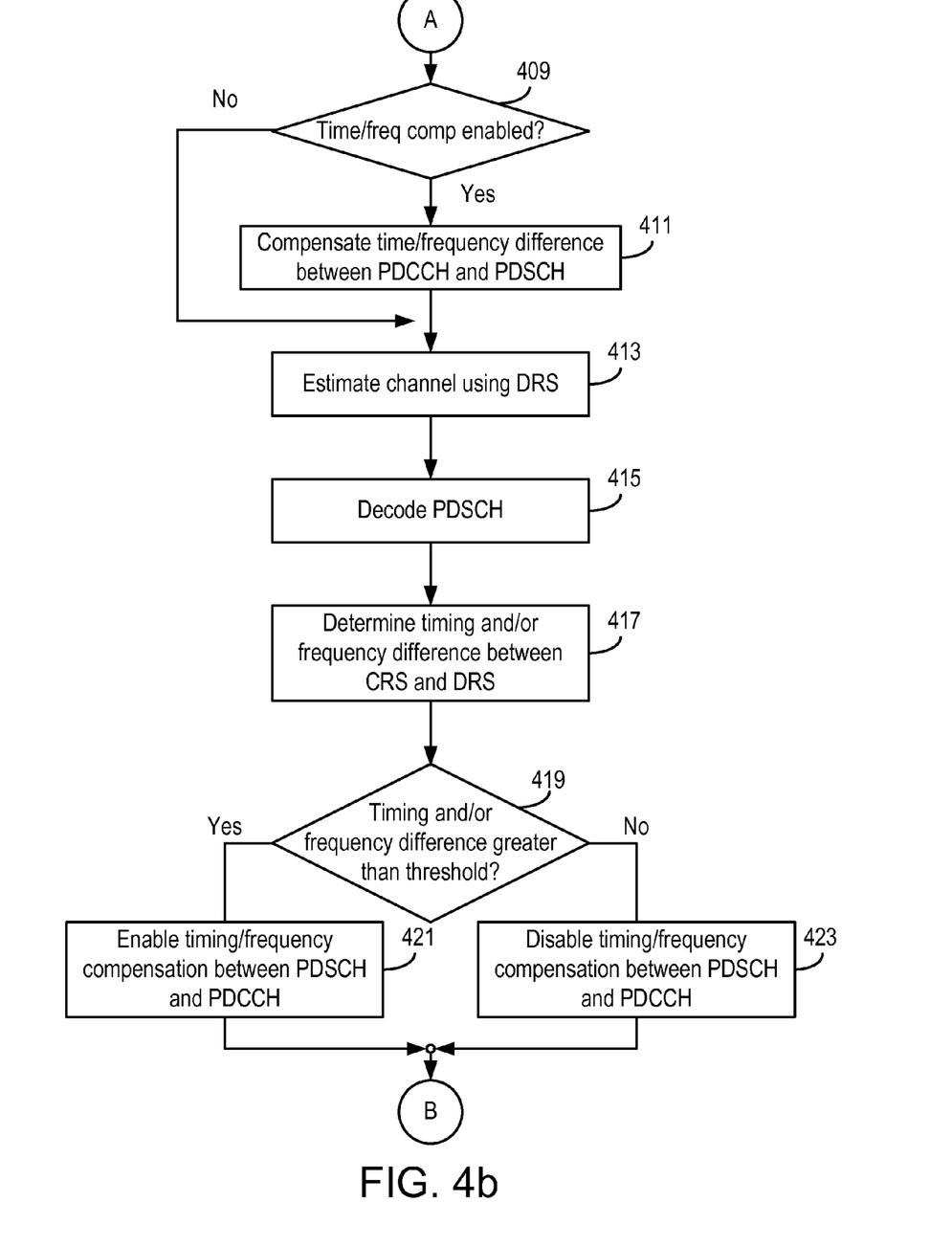

FIGS. 4a and 4b (collectively referred to herein as "FIG. 4") are, in one respect, a flow chart of steps/processes performed by a UE in accordance with exemplary embodiments of the invention. In another respect, FIGS. 4a and 4b can be considered to depict exemplary means 400 comprising various circuitry configured to perform the described functions.

It is assumed that, at the start of the data channel estimation and decoding process, the terminal is connected to a serving cell. It is initially assumed that the timing and frequency are the same for both the control channel's reference symbols (PDCCH(CRS)) and the data channel's reference symbols (PDSCH(DRS)); accordingly, timing/frequency compensation of the data channel (PDSCH) is disabled (step 401). The terminal ascertains the timing/frequency-synchronization using the CRS:s (step 403). Techniques for doing this step are well known in the art and therefore need not be described here in further detail.

Once the timing has been ascertained, the terminal receives the signal and uses the CRS:s to determine a channel estimate which is then used for demodulating the control channel (PDCCH) (step 405).

If the result of demodulation shows that there is no data directed to the terminal ("No" path out of decision block 407), then processing returns to step 403 so the terminal can wait until the next time instant that the control channel (PDCCH) needs to be decoded.

If it is ascertained that there is data directed to the terminal ("Yes" path out of decision block 407), the terminal ascertains whether timing/frequency compensation of the data channel (PDSCH) is enabled (decision block 409). In case it is enabled ("Yes" path out of decision block 409), timing/frequency compensation of the data channel (PDSCH) is performed (step 411). If it is ascertained that timing/frequency compensation of the data channel is not enabled ("No" path out of decision block 409), then the compensation step is skipped.

The channel is estimated using the (possibly compensated) dedicated reference symbols (DRS:s) (step 413), and the data is then decoded (step 415).

After the data detection, the receiver updates the timing for the DRS:s and CRS:s and determines the timing and/or frequency difference(s) between them (step 417). The magnitude of this difference will determine whether timing/frequency compensation is needed in future receiving steps. Accordingly, it is ascertained whether the estimated timing and/or frequency difference(s) satisfy a predetermined relationship with respect to a threshold value (e.g., whether the difference is greater than a threshold value) (decision block 419). If yes ("Yes" path out of decision block 419) then timing/frequency compensation between the control and data channels is enabled (step 421). Otherwise ("No" path out of decision block 419), the timing/frequency compensation is disabled (step 423). Processing then reverts back to step 403 to process upcoming OFDM symbols.

For determining the timing/frequency difference between CRS:s and DRS:s, an Instant Channel Estimate (ICH) for Resource Element (RE) position (t, f) (where "t" indicates time, and "f" indicates frequency) is defined as the received signal for the RE at (t, f) divided by the known pilot value for that position. (In LTE systems, a "resource element" is defined as one OFDM sub-carrier during one OFDM symbol interval.) An ICH pair in the frequency direction is defined as the ICH at position (t, f1) multiplied by the complex conjugate ICH at position (t, f2), where f1 and f2 are two adjacent pilot positions in the frequency direction. For example, ICH:s could be computed for each of the frequency-wise adjacent pilots 301 and 303 depicted in FIG. 3, and these ICH:s could make up an ICH pair in the frequency direction. Similarly, an ICH pair in the time direction is defined as the ICH at position (f, t1), where t1 and t2 are two adjacent pilot positions in the time direction. For example, ICH:s could be computed for each of the time-wise adjacent pilots 301 and 305 depicted in FIG. 3, and these ICH:s could make up an ICH pair in the time direction.

Figure 5A:
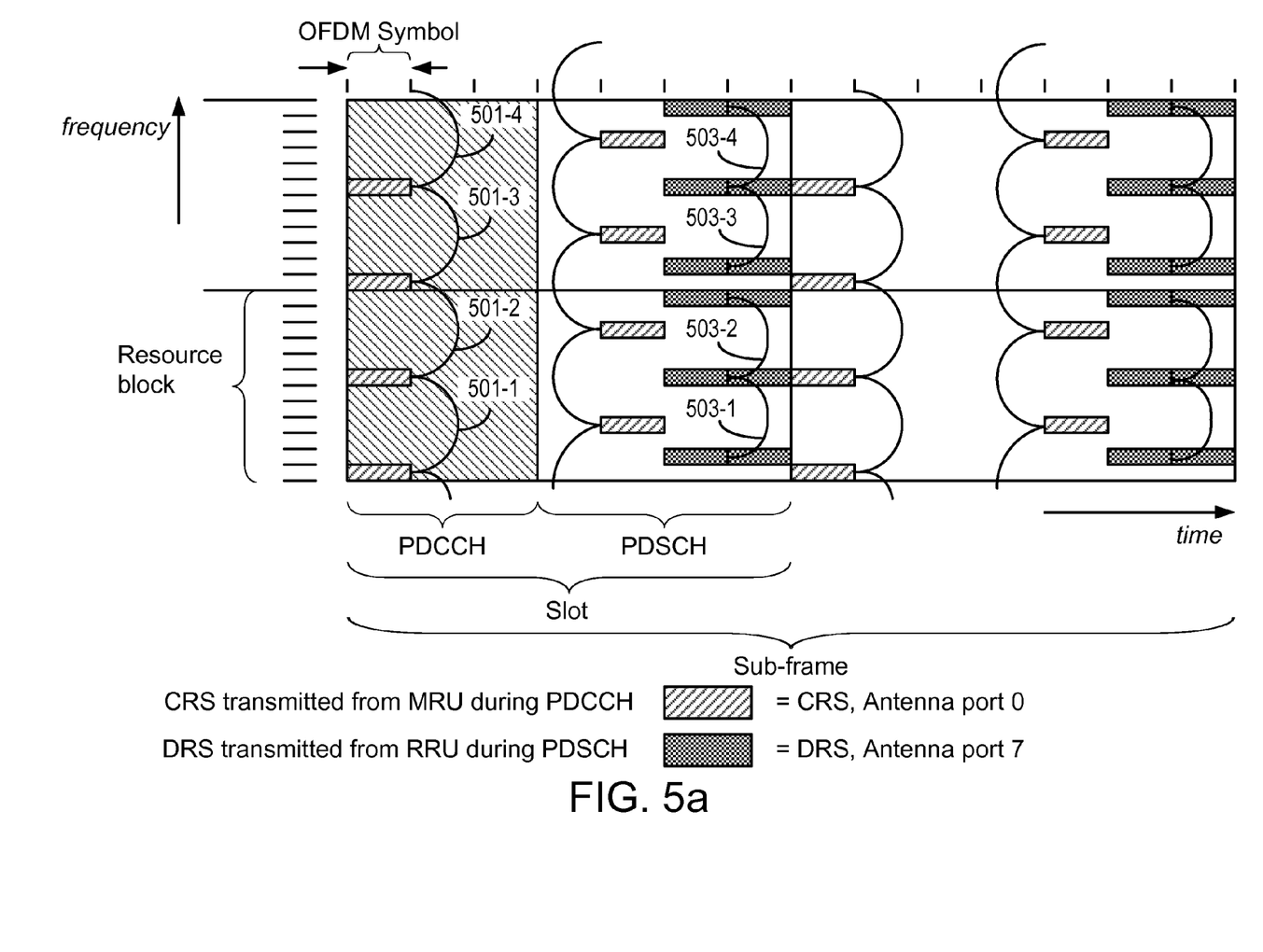
FIG. 5a is an example slot and sub-frame structure showing frequency-wise pairings of reference symbols from which a frequency rotation can be computed
Figure 5B:
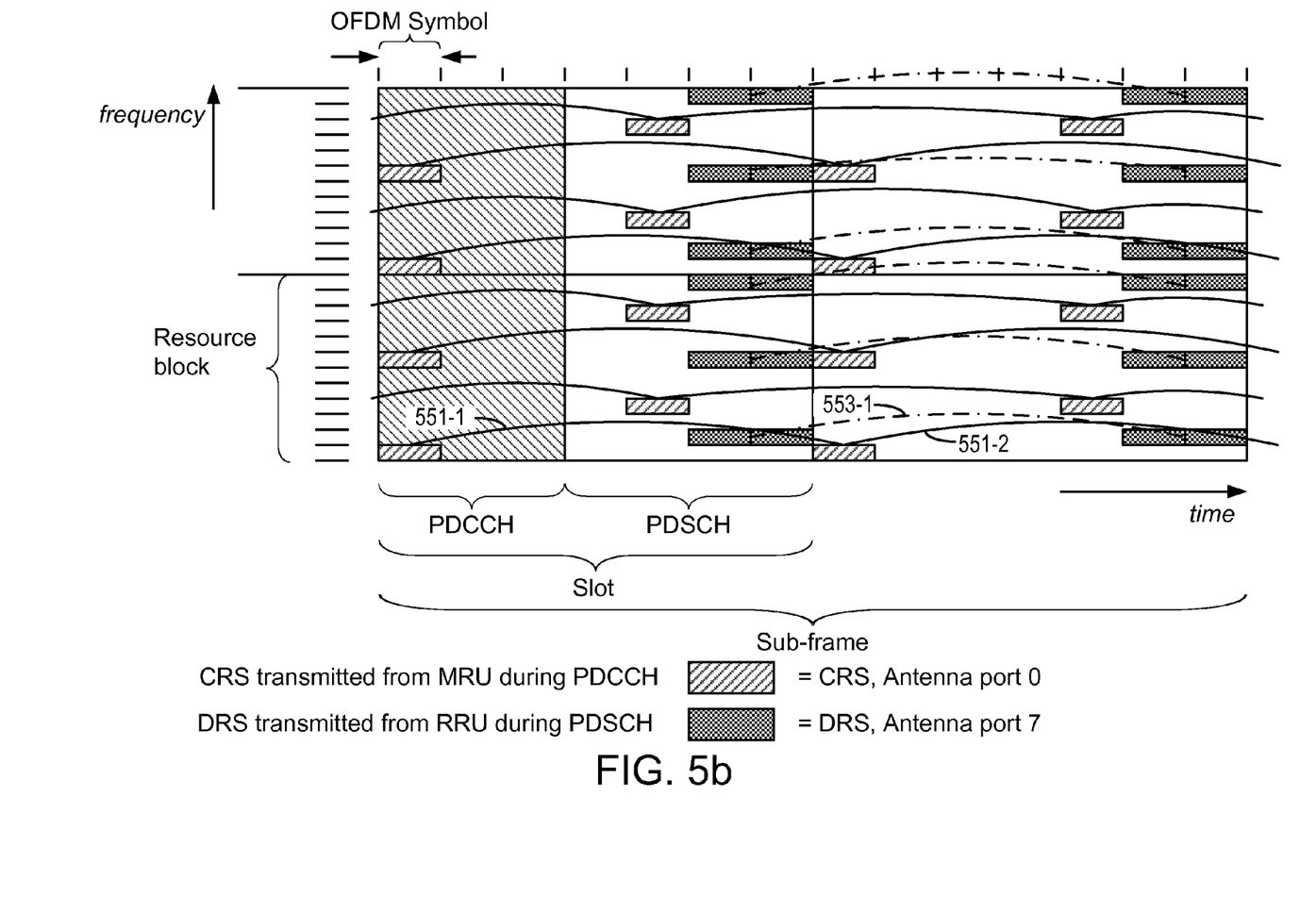
FIG. 5b is an example slot and sub-frame structure showing time-wise pairings of reference symbols from which a time rotation can be computed.

With this definition, the determination of the rotation in the frequency direction for the CRS is determined by summing over all ICH pairs containing CRS:s. FIG. 5a illustrates ICH pairs, including the ICH pairs 501-1, 501-2, 501-3, and 501-4, that can be summed to determine the rotation in the frequency direction. The sum may alternatively be over all OFDM symbols containing CRS:s to determine a rotation in time. FIG. 5b illustrates ICH pairs, including the ICH pairs 551-1 and 551-2, that can be summed to determine the rotation in the frequency direction. Then the rotation is defined as the arctangent of the imaginary part of the sum divided by the real part of the sum.

The determination of the rotation in the frequency direction for the DRS is determined by summing over all ICH pairs containing DRS:s that are within the same resource block. For example, the ICH pairs 503-1, 503-2, 503-3, and 503-4 illustrated in FIG. 5a could be summed to determine the frequency-wise rotation for the DRS:s. The sum may alternatively be over all OFDM symbols containing DRS:s within a sub-frame to produce a measure of time-wise rotation. For example, the ICH pair 553-1 in FIG. 5b can be used as an indicator of the frequency-wise rotation for the DRS:s. (It is worth noting that, in LTE systems, the DRS pilots are Code Division Multiplexed with different orthogonal codes being assigned to ports 7 and 8, which means that the port 7 and port 8 pilots share two Resource Elements, such as the resource elements 307 and 309 depicted in FIG. 3. Therefore, when finding an instant channel estimate, only one estimate for port 7 is obtained from two REs, for example on symbol 5 and 6.) Then the rotation is defined as the arctangent of the imaginary part of the sum divided by the real part of the sum.

The rotation of the DRS:s in the time direction can be computed in a similar way as that which is described above with respect to rotation in the frequency direction. The difference in the computation is that the positions (f, t1) and (f, t2) should be used in an ICH pair and the positions should be adjacent in time direction. For example the ICH pair 553-1 can be used as an indicator of the time-wise rotation of the DRS:s.

After the CRS and DRS time and/or frequency rotations are computed, a hypothesis test is made to ascertain whether the CRS and DRS timing rotations are equal, and/or whether the CRS and DRS frequency rotations are equal. The test can be, for example, to ascertain whether the absolute value of the rotation difference is larger than a threshold value. The threshold could be different for the time and frequency errors. It is noted that the tests for time and frequency rotations should be made independent of one another because they have different sources.

As to aspects relating to compensation for ascertained differences between CRS and DRS timing and/or frequency rotations, one compensation method comprises post-FFT compensation, in which a time/frequency de-rotation is made over the data (e.g., PDSCH (DRS)) resource elements. The de-rotation is herein defined as a multiplication between the REs and $\exp(-j*phi*k)$, where phi is the rotation difference in the time or frequency direction and k is the sub-carrier index or OFDM symbol number.

An alternative way to compensate for frequency rotation is to change the placement of the FFT window that is used during OFDM reception. First, the FFT window placement could be changed between the control channel (e.g., PDCCH) OFDM symbols and the data channel (e.g., PDSCH) OFDM symbols. If the OFDM symbol contains both a CRS and a DRS, one could take two FFTs at different positions, one with timing relative the data channel and another relative to the control channel.

It is further noted that the rotation obtained from any of the above-described techniques indicates how much the channel rotates between two adjacent common reference symbols. In communication systems, the reference symbols are generally not adjacent one another. For example, in LTE systems, the distance is 6 sub-carriers between two reference symbols (antenna port 0) in the frequency direction. For comparison with other rotations, the calculated rotation should be scaled by this distance; for example, in an LTE system, the equipment would divide by 6 to get the rotation between two sub-carriers. The rotation in time is similar, but in this case the distance is counted in symbols. For port 0 the distance is 7 symbols for normal CP (divide by 7). For the DRS the distance in symbols is 7 symbols (divide by 7) and in frequency direction it is 5 subcarriers (divide by 5) within a Resource Block (RB) (the equipment should only sum within a RB for the DRS:s).

Figure 6:
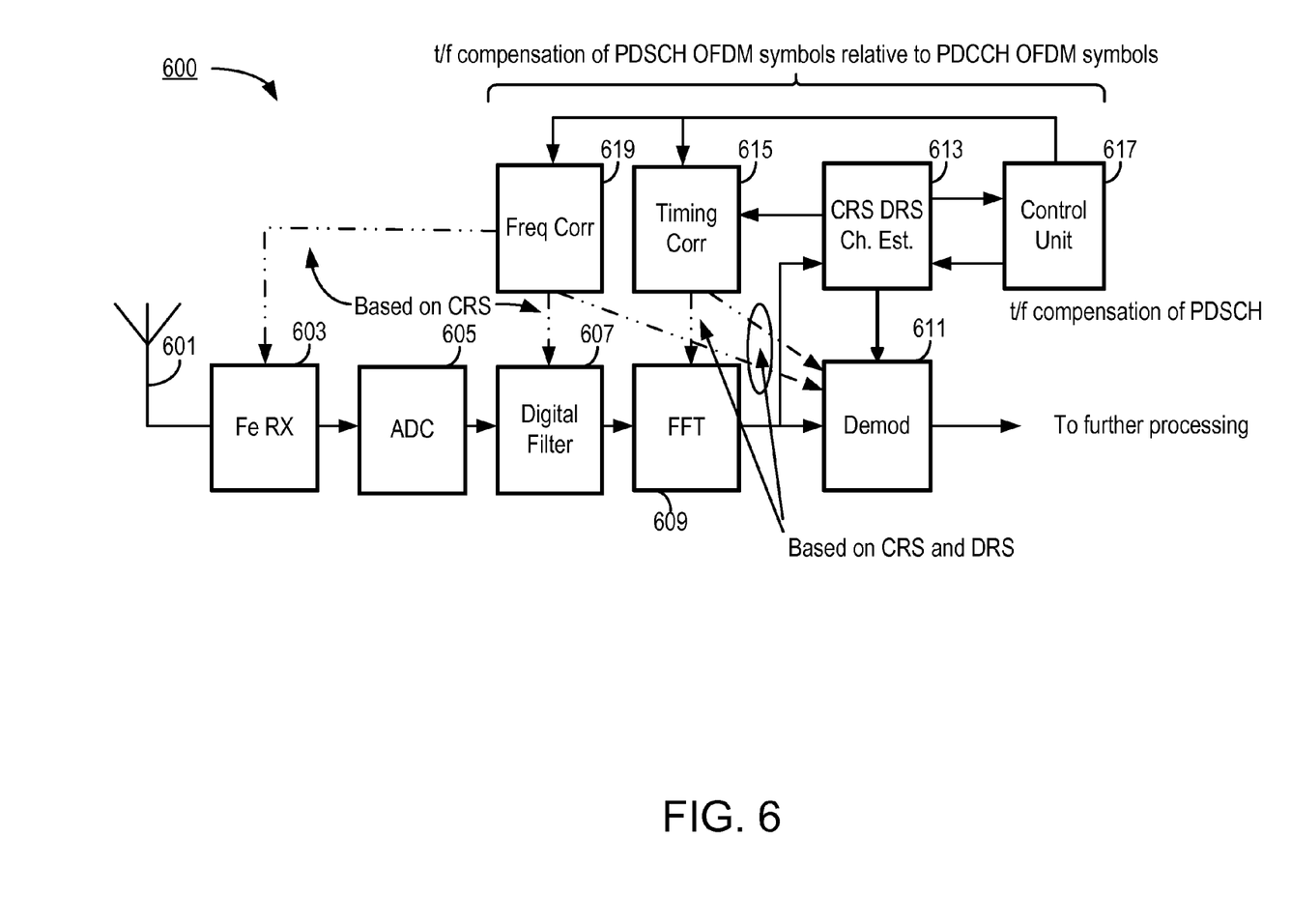
FIG. 6 is a block diagram of an exemplary receiver configured to carry out one or more of the aspects as described herein.

FIG. 6 is a block diagram of an exemplary receiver 600 configured to carry out one or more of the aspects described above (e.g., as illustrated in FIG. 4). In the figure, the receiver 600 is shown with one receiver antenna 601, but in alternative embodiments the number of antennas may be greater (e.g., for use with MIMO technology). The signal is received through the antenna 601 and down-converted in a front end receiver (FE RX) 603. The baseband signal supplied at the output of the front end receiver 603 is converted into digital form by an analog-to-digital converter 605. A digital filter 607 conditions the digital baseband signal by eliminating unwanted frequency components. The conditioned digital signal is supplied to FFT circuitry 609 that performs the FFT of the received baseband signals to obtain the signal representation in the frequency domain. The frequency domain signal is fed to a demodulator 611, in which the received data symbols are detected.

The frequency domain signal is also fed to a channel estimation unit 613 that estimates channels based on the received CRS:s and DRS:s. The channel estimation unit 613 generates timing and/or frequency information about the control and data channels, and supplies this information to timing correction circuitry 615 as well as to the demodulator 611 and a control unit 617. The control unit 617, which may be embodied in any number of ways including but not limited to programmed processing circuitry and/or hardwired electronic circuitry, controls the operation of the channel estimation unit 613, the timing correction unit 615, and also a frequency correction unit 619. The control unit 617 is, in this exemplary embodiment, configured to generate control signals that cause the receiver circuitry to carry out functions such as those depicted in FIG. 4. Accordingly, the timing corrections and frequency corrections 619 generated by the respective timing correction circuitry 615 and frequency correction circuitry 619 may be based solely on the CRS:s, or they may include compensations to account for the control signals and data signals being transmitted from different nodes (e.g., control signals being transmitted from an eNodeB and data signals being transmitted from a remote node).

Timing correction information generated by the timing correction circuitry 615 is supplied to the FFT circuitry 609 and to the demodulator 611 for use in known ways. Frequency correction information generated by the frequency correction circuitry 619 is supplied to the front end receiver 603, the digital filter 607, and to the demodulator 611, also for use in known ways.

Aspects of at least some embodiments consistent with the invention provide advantages over conventional methodology in that, whenever there is a time and/or frequency misalignment between the control channel reference symbols and the data channel reference symbols, the terminal can detect that misalignment and compensate for it. Robust receiver performance is thereby achieved.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a mobile receiver in a mobile communication system, wherein the mobile communication system comprises first and second nodes, wherein the first node transmits common control signals and the second node transmits dedicated data signals, the method comprising:
   determining at least one of a first timing of the common control signals and a first frequency of the common control signals;
   determining at least one of a second timing of the dedicated data signals and a second frequency of the dedicated data signals;
   determining at least one of a first difference and a second difference, wherein the first difference is a difference between the first timing of the common control signals and the second timing of the dedicated data signals and the second difference is a difference between the first frequency of the common control signals and the second frequency of the dedicated data signals;
   producing an adapted timing of dedicated data signals based on at least one of the first and second differences; and
   using the adapted timing to receive dedicated data signals.

2. The method of claim 1, comprising at least one of:
   determining a first relationship result by ascertaining whether the first difference satisfies a predetermined relationship with respect to a first threshold and determining a second relationship result by ascertaining whether the second difference satisfies a predetermined relationship with respect to a second threshold,
   wherein producing the adapted timing of dedicated data signals is performed only in response to at least one of the first and second relationship results indicating satisfaction of a predetermined relationship.

3. The method of claim 1, wherein determining at least one of the second timing of the dedicated data signals and the second frequency of the dedicated data signals is based on dedicated reference signals received by the receiver.

4. The method of claim 1, wherein determining the first frequency of the common control signals comprises:
   producing a plurality of Instant Channel Estimate (ICH) pairs by, for a plurality of pairs of first and second sub-carriers occurring at a first Orthogonal Frequency Division Multiplexing (OFDM) symbol time, wherein each of the first and second sub-carriers communicates a common reference symbol and for each pair of first and second sub-carriers, the first and second sub-carriers are adjacent pilot positions in the frequency domain:
      producing a first ICH for the first sub-carrier;
      producing a second ICH for the second sub-carrier; and
      producing an ICH pair by multiplying the first ICH by the complex conjugate of the second ICH; and
   determining a frequency by summing the plurality of ICH pairs.

5. The method of claim 4, wherein determining a frequency by summing the plurality of ICH pairs comprises determining a frequency rotation by summing the plurality of ICH pairs.

6. The method of claim 1, wherein determining the second frequency of the dedicated data signals comprises:
   producing a plurality of Instant Channel Estimate (ICH) pairs by, for a plurality of pairs of first and second sub-carriers located within a same contiguous block of sub-carriers allocated to the mobile receiver and occurring at a first Orthogonal Frequency Division Multiplexing (OFDM) symbol time, wherein each of the first and second sub-carriers communicates a dedicated reference symbol and for each pair of first and second sub-carriers, the first and second sub-carriers are adjacent pilot positions in the frequency domain:
      producing a first ICH for the first sub-carrier;
      producing a second ICH for the second sub-carrier; and
      producing an ICH pair by multiplying the first ICH by the complex conjugate of the second ICH; and
   determining a frequency by summing the plurality of ICH pairs.

7. The method of claim 6, wherein determining a frequency by summing the plurality of ICH pairs comprises determining a frequency rotation by summing the plurality of ICH pairs.

8. The method of claim 1, wherein determining the first frequency of the common control signals comprises:
   producing a plurality of Instant Channel Estimate (ICH) pairs by, for each of a plurality of Orthogonal Frequency Division Multiplexing (OFDM) symbols containing common reference symbols:
      identifying pairs of first and second sub-carriers that are a component of said each OFDM symbol, wherein each of the first and second sub-carriers communicates a common reference symbol and for each pair of first and second sub-carriers, the first and second sub-carriers are adjacent pilot positions in the frequency domain; and
      for each of the pairs of first and second sub-carriers:
         producing a first ICH for the first sub-carrier;
         producing a second ICH for the second sub-carrier; and
         producing an ICH pair by multiplying the first ICH by the complex conjugate of the second ICH; and
   determining a frequency as the arctangent of the imaginary part of the sum of the plurality of ICH pairs divided by the real part of the sum of the plurality of ICH pairs.

9. The method of claim 8, wherein determining a frequency as the arctangent of the imaginary part of the sum of the plurality of ICH pairs divided by the real part of the sum of the plurality of ICH pairs comprises determining a frequency rotation as the arctangent of the imaginary part of the sum of the plurality of ICH pairs divided by the real part of the sum of the plurality of ICH pairs.

10. The method of claim 8, comprising:
   scaling the determined frequency for sub-carriers located between the first sub-carrier and the second sub-carrier, wherein an amount of scaling is based on a frequency distance between the first sub-carrier and the second sub-carrier.

11. The method of claim 1, wherein determining the second frequency of the dedicated data signals comprises:
   producing a plurality of Instant Channel Estimate (ICH) pairs by, for each of a plurality of Orthogonal Frequency Division Multiplexing (OFDM) symbols containing dedicated reference symbols:
      identifying pairs of first and second sub-carriers located within a same contiguous block of sub-carriers allocated to the mobile receiver and that are a component of said each OFDM symbol, wherein each of the first and second sub-carriers communicates a dedicated reference symbol and for each pair of first and second sub-carriers, the first and second sub-carriers are adjacent pilot positions in the frequency domain; and
      for each of the pairs of first and second sub-carriers:
         producing a first ICH for the first sub-carrier;
         producing a second ICH for the second sub-carrier; and
         producing an ICH pair by multiplying the first ICH by the complex conjugate of the second ICH; and
   determining a frequency as the arctangent of the imaginary part of the sum of the plurality of ICH pairs divided by the real part of the sum of the plurality of ICH pairs.

12. The method of claim 11, wherein determining a frequency as the arctangent of the imaginary part of the sum of the plurality of ICH pairs divided by the real part of the sum of the plurality of ICH pairs comprises determining a frequency rotation as the arctangent of the imaginary part of the sum of the plurality of ICH pairs divided by the real part of the sum of the plurality of ICH pairs.

13. The method of claim 11, comprising:
   scaling the determined frequency for sub-carriers located between the first sub-carrier and the second sub-carrier, wherein an amount of scaling is based on a frequency distance between the first sub-carrier and the second sub-carrier.

14. The method of claim 1, wherein determining the first timing of the common control signals comprises:
   producing a plurality of Instant Channel Estimate (ICH) pairs by, for a plurality of pairs of adjacent Orthogonal Frequency Division Multiplexing (OFDM) symbol times of time-wise adjacent common reference symbols, performing, for each of one or more given sub-carriers that communicate a common reference symbol:
      producing a first ICH for a first one of the OFDM symbol times;
      producing a second ICH for a second one of the OFDM symbol times; and
      producing an ICH pair by multiplying the first ICH by the complex conjugate of the second ICH; and determining a timing by summing the plurality of ICH pairs.

15. The method of claim 14, wherein determining a timing by summing the plurality of ICH pairs comprises determining a rotation in timing by summing the plurality of ICH pairs.

16. The method of claim 14, comprising:
scaling the determined timing for symbols located between the first one of the OFDM symbol times and the second one of the OFDM symbol times, wherein an amount of scaling is based on a symbol time distance between the first one of the OFDM symbol times and the second one of the OFDM symbol times.

17. The method of claim 1, wherein determining the second timing of the dedicated data signals comprises:
producing a plurality of Instant Channel Estimate (ICH) pairs by, for a plurality of pairs of adjacent Orthogonal Frequency Division Multiplexing (OFDM) symbol times of time-wise adjacent dedicated reference symbols, performing, for each of one or more given sub-carriers that communicate a dedicated reference symbol:
producing a first ICH for a first one of the OFDM symbol times;
producing a second ICH for a second one of the OFDM symbol times; and
producing an ICH pair by multiplying the first ICH by the complex conjugate of the second ICH; and
determining a timing by summing the plurality of ICH pairs.

18. The method of claim 17, wherein determining a timing by summing the plurality of ICH pairs comprises determining a rotation in timing by summing the plurality of ICH pairs.

19. The method of claim 17, comprising:
scaling the determined timing for symbols located between the first one of the OFDM symbol times and the second one of the OFDM symbol times, wherein an amount of scaling is based on a symbol time distance between the first one of the OFDM symbol times and the second one of the OFDM symbol times.

20. An apparatus for operating a mobile receiver in a mobile communication system, wherein the mobile communication system comprises first and second nodes, wherein the first node transmits common control signals and the second node transmits dedicated data signals, the apparatus comprising:
circuitry configured to determine at least one of a first timing of the common control signals and a first frequency of the common control signals;
circuitry configured to determine at least one of a second timing of the dedicated data signals and a second frequency of the dedicated data signals;
circuitry configured to determine at least one of a first difference and a second difference, wherein the first difference is a difference between the first timing of the common control signals and the second timing of the dedicated data signals and the second difference is a difference between the first frequency of the common control signals and the second frequency of the dedicated data signals;
circuitry configured to produce an adapted timing of dedicated data signals based on at least one of the first and second differences; and
circuitry configured to use the adapted timing to receive dedicated data signals.

21. The apparatus of claim 20, comprising at least one of:
circuitry configured to determine a first relationship result by ascertaining whether the first difference satisfies a predetermined relationship with respect to a first threshold and circuitry configured to determine a second relationship result by ascertaining whether the second difference satisfies a predetermined relationship with respect to a second threshold,
wherein the circuitry configured to produce the adapted timing of dedicated data signals is activated only in response to at least one of the first and second relationship results indicating satisfaction of a predetermined relationship.

22. The apparatus of claim 20, wherein the circuitry configured to determine at least one of the second timing of the dedicated data signals and the second frequency of the dedicated data signals makes the determination based on dedicated reference signals received by the receiver.

23. The apparatus of claim 20, wherein the circuitry configured to determine the first frequency of the common control signals comprises:
circuitry configured to produce a plurality of Instant Channel Estimate (ICH) pairs by, for a plurality of pairs of first and second sub-carriers occurring at a first Orthogonal Frequency Division Multiplexing (OFDM) symbol time, wherein each of the first and second sub-carriers communicates a common reference symbol and for each pair of first and second sub-carriers, the first and second sub-carriers are adjacent pilot positions in the frequency domain:
producing a first ICH for the first sub-carrier;
producing a second ICH for the second sub-carrier; and
producing an ICH pair by multiplying the first ICH by the complex conjugate of the second ICH; and
circuitry configured to determine a frequency by summing the plurality of ICH pairs.

24. The apparatus of claim 23, wherein the circuitry configured to determine a frequency by summing the plurality of ICH pairs comprises circuitry configured to determine a frequency rotation by summing the plurality of ICH pairs.

25. The apparatus of claim 20, wherein the circuitry configured to determine the second frequency of the dedicated data signals comprises:
circuitry configured to produce a plurality of Instant Channel Estimate (ICH) pairs by, for a plurality of pairs of first and second sub-carriers located within a same contiguous block of sub-carriers allocated to the mobile receiver and occurring at a first Orthogonal Frequency Division Multiplexing (OFDM) symbol time, wherein each of the first and second sub-carriers communicates a dedicated reference symbol and for each pair of first and second sub-carriers, the first and second sub-carriers are adjacent pilot positions in the frequency domain:
producing a first ICH for the first sub-carrier;
producing a second ICH for the second sub-carrier; and
producing an ICH pair by multiplying the first ICH by the complex conjugate of the second ICH; and
circuitry configured to determine a frequency by summing the plurality of ICH pairs.

26. The apparatus of claim 25, wherein the circuitry configured to determine a frequency by summing the plurality of ICH pairs comprises circuitry configured to determine a frequency rotation by summing the plurality of ICH pairs.

27. The apparatus of claim 20, wherein the circuitry configured to determine the first frequency of the common control signals comprises:
circuitry configured to produce a plurality of Instant Channel Estimate (ICH) pairs by, for each of a plurality of Orthogonal Frequency Division Multiplexing (OFDM) symbols containing common reference symbols:

identifying pairs of first and second sub-carriers that are a component of said each OFDM symbol, wherein each of the first and second sub-carriers communicates a common reference symbol and for each pair of first and second sub-carriers, the first and second sub-carriers are adjacent pilot positions in the frequency domain; and for each of the pairs of first and second sub-carriers:
producing a first ICH for the first sub-carrier;
producing a second ICH for the second sub-carrier; and
producing an ICH pair by multiplying the first ICH by the complex conjugate of the second ICH; and circuitry configured to determine a frequency as the arctangent of the imaginary part of the sum of the plurality of ICH pairs divided by the real part of the sum of the plurality of ICH pairs.

28. The apparatus of claim 27, wherein the circuitry configured to determine a frequency as the arctangent of the imaginary part of the sum of the plurality of ICH pairs divided by the real part of the sum of the plurality of ICH pairs comprises circuitry configured to determine a frequency rotation as the arctangent of the imaginary part of the sum of the plurality of ICH pairs divided by the real part of the sum of the plurality of ICH pairs.

29. The apparatus of claim 27, comprising:
circuitry configured to scale the determined frequency for sub-carriers located between the first sub-carrier and the second sub-carrier, wherein an amount of scaling is based on a frequency distance between the first sub-carrier and the second sub-carrier.

30. The apparatus of claim 20, wherein the circuitry configured to determine the second frequency of the dedicated data signals comprises:
circuitry configured to produce a plurality of Instant Channel Estimate (ICH) pairs by, for each of a plurality of Orthogonal Frequency Division Multiplexing (OFDM) symbols containing dedicated reference symbols:
identifying pairs of first and second sub-carriers located within a same contiguous block of sub-carriers allocated to the mobile receiver and that are a component of said each OFDM symbol, wherein each of the first and second sub-carriers communicates a dedicated reference symbol and for each pair of first and second sub-carriers, the first and second sub-carriers are adjacent pilot positions in the frequency domain; and
for each of the pairs of first and second sub-carriers:
producing a first ICH for the first sub-carrier;
producing a second ICH for the second sub-carrier; and
producing an ICH pair by multiplying the first ICH by the complex conjugate of the second ICH; and
circuitry configured to determine a frequency as the arctangent of the imaginary part of the sum of the plurality of ICH pairs divided by the real part of the sum of the plurality of ICH pairs.

31. The apparatus of claim 30, wherein the circuitry configured to determine a frequency as the arctangent of the imaginary part of the sum of the plurality of ICH pairs divided by the real part of the sum of the plurality of ICH pairs comprises circuitry configured to determine a frequency rotation as the arctangent of the imaginary part of the sum of the plurality of ICH pairs divided by the real part of the sum of the plurality of ICH pairs.

32. The method of claim 30, comprising:
circuitry configured to scale the determined frequency for sub-carriers located between the first sub-carrier and the second sub-carrier, wherein an amount of scaling is based on a frequency distance between the first sub-carrier and the second sub-carrier.

33. The apparatus of claim 20, wherein the circuitry configured to determine the first timing of the common control signals comprises:
circuitry configured to produce a plurality of Instant Channel Estimate (ICH) pairs by, for a plurality of pairs of adjacent Orthogonal Frequency Division Multiplexing (OFDM) symbol times of time-wise adjacent common reference symbols, performing, for each of one or more given sub-carriers that communicate a common reference symbol:
producing a first ICH for a first one of the OFDM symbol times;
producing a second ICH for a second one of the OFDM symbol times; and
producing an ICH pair by multiplying the first ICH by the complex conjugate of the second ICH; and
circuitry configured to determine a timing by summing the plurality of ICH pairs.

34. The apparatus of claim 33, wherein the circuitry configured to determine a timing by summing the plurality of ICH pairs comprises circuitry configured to determine a rotation in timing by summing the plurality of ICH pairs.

35. The apparatus of claim 33, comprising:
circuitry configured to scale the determined timing for symbols located between the first one of the OFDM symbol times and the second one of the OFDM symbol times, wherein an amount of scaling is based on a symbol time distance between the first one of the OFDM symbol times and the second one of the OFDM symbol times.

36. The apparatus of claim 20, wherein the circuitry configured to determine the second timing of the dedicated data signals comprises:
circuitry configured to produce a plurality of Instant Channel Estimate (ICH) pairs by, for a plurality of pairs of adjacent Orthogonal Frequency Division Multiplexing (OFDM) symbol times of time-wise adjacent dedicated reference symbols, performing, for each of one or more given sub-carriers that communicate a dedicated reference symbol:
producing a first ICH for a first one of the OFDM symbol times;
producing a second ICH for a second one of the OFDM symbol times; and
producing an ICH pair by multiplying the first ICH by the complex conjugate of the second ICH; and
circuitry configured to determine a timing by summing the plurality of ICH pairs.

37. The apparatus of claim 36, wherein the circuitry configured to determining a timing by summing the plurality of ICH pairs comprises circuitry configured to determine a rotation in timing by summing the plurality of ICH pairs.

38. The apparatus of claim 36, comprising:
circuitry configured to scale the determined timing for symbols located between the first one of the OFDM symbol times and the second one of the OFDM symbol times, wherein an amount of scaling is based on a symbol time distance between the first one of the OFDM symbol times and the second one of the OFDM symbol times.

* * * * *

UNITED STATES PATENT AND TRADEMARK OFFICE
CERTIFICATE OF CORRECTION

PATENT NO. : 8,520,777 B2  
APPLICATION NO. : 13/033722  
DATED : August 27, 2013  
INVENTOR(S) : Lindoff et al.

Page 1 of 1

It is certified that error appears in the above-identified patent and that said Letters Patent is hereby corrected as shown below:

In the Claims:

In Column 16, Line 1, in Claim 32, delete "method" and insert -- apparatus --, therefor.

Signed and Sealed this
Twenty-ninth Day of July, 2014

Michelle K. Lee
*Deputy Director of the United States Patent and Trademark Office*